US012762512B2

(12) United States Patent
Thirunavukkarasu et al.

(10) Patent No.: US 12,762,512 B2
(45) Date of Patent: Oct. 13, 2026

(54) METHOD AND SYSTEM FOR MANAGING ITEM RETURNS

(71) Applicant: TATA CONSULTANCY SERVICES LIMITED, Mumbai (IN)

(72) Inventors: Jeisobers Thirunavukkarasu, Chennai (IN); Thangakumar Krishnadhas Mani, Chennai (IN); Srjana Balraj, Amsterdam (NL); Gulshan Rajkumar, Karnataka (IN)

(73) Assignee: TATA CONSULTANCY SERVICES LIMITED, Mumbai (IN)

( * ) Notice: Subject to any disclaimer, the term of this patent is extended or adjusted under 35 U.S.C. 154(b) by 0 days.

(21) Appl. No.: 19/078,079

(22) Filed: Mar. 12, 2025

(65) Prior Publication Data

US 2025/0292189 A1 Sep. 18, 2025

(30) Foreign Application Priority Data

Mar. 14, 2024 (IN) ............................ 202421018725

(51) Int. Cl.

*G06Q 10/087* (2023.01)
*G06N 20/00* (2019.01)
*G06Q 10/08* (2024.01)
*G06Q 10/0837* (2023.01)
*G06Q 30/0202* (2023.01)

(52) U.S. Cl.

CPC ........... *G06Q 10/087* (2013.01); *G06N 20/00* (2019.01); *G06Q 10/08* (2013.01); *G06Q 10/0837* (2013.01); *G06Q 30/0202* (2013.01)

(58) Field of Classification Search

None

See application file for complete search history.

(56) References Cited

U.S. PATENT DOCUMENTS

| | | | | |
|---|---|---|---|---|
| 2013/0006975 A1* | 1/2013 | Li | ........................ | G06F 40/247 707/723 |
| 2016/0321683 A1* | 11/2016 | Chen | .................. | G06Q 30/0208 |
| 2018/0047083 A1* | 2/2018 | Agarwal | ............. | G06Q 30/012 |

(Continued)

FOREIGN PATENT DOCUMENTS

WO WO-2020219666 A1 * 10/2020 ......... G06Q 30/0201

OTHER PUBLICATIONS

Yanjie Fu et al., "Fused latent models for assessing product return propensity in online commerce," Nov. 2016, Decision Support Systems, vol. 91, pp. 77-88 (Year: 2016).*

(Continued)

*Primary Examiner* — Amanda Gurski

(74) *Attorney, Agent, or Firm* — Finnegan, Henderson, Farabow, Garrett & Dunner, LLP

(57) ABSTRACT

The present disclosure estimates items to be returned based on nature of items picked online in association with the context. The context includes time, shopper details, local events and the like. It is addressed by mapping return spread and similarity spread or linkage spread in unique format. Further, the intrinsic mechanism that result returns are captured by training a multivariate Machine Learning (ML) model using the actual return spread, the similarity spread, or the linkage spread and the customer profile data. The captured return mechanism is leveraged to pre-empt the returns online in the form of return spread at the time of ordering in real time.

14 Claims, 5 Drawing Sheets

(56) References Cited

U.S. PATENT DOCUMENTS

| | | | | |
|---|---|---|---|---|
| 2018/0349846 | A1* | 12/2018 | Sever | G06Q 30/0641 |
| 2023/0306493 | A1* | 9/2023 | Downey | G06F 18/214 |

OTHER PUBLICATIONS

Mrugank Akarte et al., "Returns Propensity Prediction for Online Orders," Dec. 2020, Columbia Edu, https://datascience.columbia.edu/wp-content/uploads/2020/12/44_Ralph-Lauren_Returns-Propensity-Prediction-for-Online-Orders.pdf.

Xiaolin Li et al., "A trust-aware random walk model for return propensity estimation and consumer anomaly scoring in online shopping," Science China Information Sciences, Mar. 19, 2019, vol. 62, Springer Nature, https://link.springer.com/article/10.1007/s11432-018-9511-1.

Yanjie Fua et al."Fused latent models for assessing product return propensity in online commerce," Decision Support Systems, Jul. 6, 2016, pp. 77-88, vol. 91, 2025 Elsevier B.V., https://www.sciencedirect.com/science/article/abs/pii/S0167923616301385.

* cited by examiner

| SKU_ID | Brand | Memory (GB) | Color |
|---|---|---|---|
| 1 | X | 2 | White |
| 2 | Y | 4 | Pink |
| 3 | X | 16 | Pink |
| | | | |
| | | | |
| | Z | 4 | Pink |
| | Z | 16 | Pink |
| | Y | 2 | Black |
| | Y | 4 | Black |

| SKU_ID | Brand | Memory (GB) | Color |
|---|---|---|---|
| 1 | 0.3 | 2 | 0.09 |
| 2 | 0.1 | 4 | 0.07 |
| 3 | 0.3 | 16 | 0.07 |
| | | | |
| | | | |
| | 0.02 | 4 | 0.07 |
| | 0.02 | 16 | 0.07 |
| | 0.1 | 2 | 0.2 |
| ~~~ | 0.1 | 4 | 0.2 |

| SKU_ID | Brand | Memory (GB) | Color |
|---|---|---|---|
| 1 | 1 | 0 | 0.15 |
| 2 | 0.28 | 0.14 | 0 |
| 3 | 1 | 1 | 0 |
| | | | |
| | | | |
| -- | 0 | 0.14 | 0 |
| | 0 | 1 | 0 |
| | 0.28 | 0 | 1 |
| ~ | 0.28 | 0.14 | 1 |

FIG. 3

METHOD AND SYSTEM FOR MANAGING ITEM RETURNS

PRIORITY CLAIM

This U.S. patent application claims priority under 35 U.S.C. § 119 to: India application No. 202421018725, filed on 14 Mar. 2024. The entire contents of the aforementioned application are incorporated herein by reference.

TECHNICAL FIELD

The disclosure herein generally relates to the field of e-commerce and, more particularly, to a method and system for managing item returns.

BACKGROUND

Online shopping is becoming a convenient shopping method for consumers because of its fast product search, quick payment, and timely delivery to their doorstep. As a result, it has become part of most consumers' lifestyle, leading to an explosive growth of e-commerce. However, there is a high rate of product returns in online shopping when compared to customers of brick-and-mortar retailers. Because online shoppers cannot touch and feel a product, to determine how well it fits their tastes and needs. Instead, they have to rely on textual descriptions, photos, and, in general, representations that may not be sufficiently accurate or media rich. Therefore, it is more difficult for customers to make accurate decisions, with a potentially higher risk of dissatisfaction when they receive the product. Hence, shoppers take a cautious approach and add many similar items into the cart that satisfy the intended characteristics and proceed for check out. In many instances, the number of similar items ordered by shoppers are many with varying degree of similarity that satisfies the intended characteristics. Because of this, most consumers choose to return one or more products, according to the merchant's return policy. Although liberal return policies can motivate consumers to purchase from online retailers and can help build customer loyalty, without proper management and control they can lead to substantial losses for consumers, retailers, and manufacturers.

Conventional methods generally focus on predicting product return policies based on influencing customer purchasing behaviors. Some other conventional methods focus on forecasting product returns at the product category level, in order to optimize inventory control. However, there is a lack of methods and systems to systematically analyze the key driving forces driving consumers' product returns based on historical data, and to predict the potential returns.

SUMMARY

Embodiments of the present disclosure present technological improvements as solutions to one or more of the above-mentioned technical problems recognized by the inventors in conventional systems. For example, in one embodiment, a method for managing item returns is provided. The method includes receiving, via one or more hardware processors, a historical transaction data associated with each of a plurality of invoices pertaining to shoppers and a contextual information, wherein the historical transaction data comprises an online transaction data, a customer profile, an online return data, and the contextual information comprises a plurality of local events, wherein each of the plurality of invoices is associated with at least one group from among a plurality of groups, wherein each of the plurality of groups is formed based on a level of hierarchy, and wherein the level of hierarchy comprises a department, a category, a class, and a subclass. Further, the method includes generating, via the one or more hardware processors, a return spread for each of the plurality of groups pertaining to each of the plurality of invoices based on the historical transaction data, wherein a value associated with each column of the return spread pertaining to each of a plurality of items associated with each of the plurality of groups is one of a) a zero and b) a one based on a return status associated with each of a plurality of purchased items, wherein zero value indicates one of a) an item is not returned and b) the item is not wherein each of the plurality of purchased items comprises a plurality of attributes and, wherein each of the plurality of attribute value is one of (i) a qualitative value or (ii) a quantitative value. Furthermore, the method includes simultaneously generating, via the one or more hardware processors, a dynamic similarity spread for each of the plurality of groups pertaining to each of the plurality of invoices based on the historical transaction data, wherein each of a plurality of column associated with the similarity spread pertains to each of the plurality of items associated with each of the plurality of groups, wherein each of the plurality of columns associated with the similarity spread is updated with a number of similar items associated with each of the plurality of purchased items from among the plurality of items by measuring a similarity between each of the plurality of purchased items pertaining to each of the plurality of groups using one of (i) a distance matrix (ii) a correlation matrix and (iii) an attribute matching percentage matrix. Furthermore, the method includes simultaneously generating, via the one or more hardware processors, a dynamic linkage spread for each of the plurality of groups pertaining to each of the plurality of invoices based on the historical transaction data by applying PCoA (Principal Coordinate Analysis) on an associated distance matrix. Furthermore, the method includes training, via the one or more hardware processors, a multivariate multiple binary Machine Learning (ML) model for predicting a plurality of potential return items based on the historical transaction data by mapping the return spread associated with each of the plurality of groups with one of a) the dynamic similarity spread and b) the dynamic linkage spread associated with each of the plurality of groups and the customer profile and contextual information. Finally, the method includes fine-tuning, via the one or more hardware processors, the trained multivariate multiple binary ML model by modifying inputs associated with one of a) similarity spread and d) linkage spread until an optimal wilks lambda criterion is obtained, wherein the inputs comprises the distance matrix, the correlation matrix, the attribute matching percentage matrix and a linkage strength obtained from PCoA.

In another aspect, a managing item returns is provided. The system includes at least one memory storing programmed instructions, one or more Input/Output (I/O) interfaces, and one or more hardware processors operatively coupled to the at least one memory, wherein the one or more hardware processors are configured by the programmed instructions to receive a historical transaction data associated with each of a plurality of invoices pertaining to shoppers and a contextual information, wherein the historical transaction data comprises an online transaction data, a customer profile, an online return data, and the contextual information comprises a plurality of local events, wherein each of the plurality of invoices is associated with at least one group from among a plurality of groups, wherein each of the plurality of groups is formed based on a level of hierarchy, and wherein the level of hierarchy comprises a department, a category, a class, and a subclass. Further, the one or more hardware processors are configured by the programmed instructions to generate a return spread for each of the plurality of groups pertaining to each of the plurality of invoices based on the historical transaction data, wherein a value associated with each column of the return spread pertaining to each of a plurality of items associated with each of the plurality of groups is one of a) a zero and b) a one based on a return status associated with each of a plurality of purchased items, wherein zero value indicates one of a) an item is not returned and b) the item is not purchased, wherein the one value indicates the item is returned previously and, wherein each of the plurality of purchased items comprises a plurality of attributes and, wherein each of the plurality of attribute value is one of (i) a qualitative value or (ii) a quantitative value. Furthermore, the one or more hardware processors are configured by the programmed instructions to simultaneously generate, a dynamic similarity spread for each of the plurality of groups pertaining to each of the plurality of invoices based on the historical transaction data, wherein each of a plurality of column associated with the similarity spread pertains to each of the plurality of items associated with each of the plurality of groups, wherein each of the plurality of columns associated with the similarity spread is updated with a number of similar items associated with each of the plurality of purchased items from among the plurality of items by measuring a similarity between each of the plurality of purchased items pertaining to each of the plurality of groups using one of (i) a distance matrix (ii) a correlation matrix and (iii) an attribute matching percentage matrix. Furthermore, the one or more hardware processors are configured by the programmed instructions to simultaneously generate a dynamic linkage spread for each of the plurality of groups pertaining to each of the plurality of invoices based on the historical transaction data by applying PCoA (Principal Coordinate Analysis) on an associated distance matrix. Furthermore, the one or more hardware processors are configured by the programmed instructions to train a multivariate multiple binary Machine Learning (ML) model for predicting a plurality of potential return items based on the historical transaction data by mapping the return spread associated with each of the plurality of groups with one of a) the dynamic similarity spread and b) the dynamic linkage spread associated with each of the plurality of groups and the customer profile and contextual information. Finally, the one or more hardware processors are configured by the programmed instructions to finetune the trained multivariate multiple binary ML model by modifying inputs associated with one of a) similarity spread and d) linkage spread until an optimal wilks lambda criterion is obtained, wherein the inputs comprises the distance matrix, the correlation matrix, the attribute matching percentage matrix and a linkage strength obtained from PCoA.

In yet another aspect, a computer program product including a non-transitory computer-readable medium embodied therein a computer program for managing item returns is provided. The computer readable program, when executed on a computing device, causes the computing device to receive a historical transaction data associated with each of a plurality of invoices pertaining to shoppers and a contextual information, wherein the historical transaction data comprises an online transaction data, a customer profile, an online return data, and the contextual information comprises a plurality of local events, wherein each of the plurality of invoices is associated with at least one group from among a plurality of groups, wherein each of the plurality of groups is formed based on a level of hierarchy, and wherein the level of hierarchy comprises a department, a category, a class, and a subclass. Further, the computer readable program, when executed on a computing device, causes the computing device to generate a return spread for each of the plurality of groups pertaining to each of the plurality of invoices based on the historical transaction data, wherein a value associated with each column of the return spread pertaining to each of a plurality of items associated with each of the plurality of groups is one of a) a zero and b) a one based on a return status associated with each of a plurality of purchased items, wherein zero value indicates one of a) an item is not returned and b) the item is not wherein each of the plurality of purchased items comprises a plurality of attributes and, wherein each of the plurality of attribute value is one of (i) a qualitative value or (ii) a quantitative value. Furthermore, the computer readable program, when executed on a computing device, causes the computing device to simultaneously generate, a dynamic similarity spread for each of the plurality of groups pertaining to each of the plurality of invoices based on the historical transaction data, wherein each of a plurality of column associated with the similarity spread pertains to each of the plurality of items associated with each of the plurality of groups, wherein each of the plurality of columns associated with the similarity spread is updated with a number of similar items associated with each of the plurality of purchased items from among the plurality of items by measuring a similarity between each of the plurality of purchased items pertaining to each of the plurality of groups using one of (i) a distance matrix (ii) a correlation matrix and (iii) an attribute matching percentage matrix. Furthermore, the computer readable program, when executed on a computing device, causes the computing device to simultaneously generate a dynamic linkage spread for each of the plurality of groups pertaining to each of the plurality of invoices based on the historical transaction data by applying PCoA (Principal Coordinate Analysis) on an associated distance matrix. Furthermore, the one or more hardware processors are configured by the programmed instructions to train a multivariate multiple binary Machine Learning (ML) model for predicting a plurality of potential return items based on the historical transaction data by mapping the return spread associated with each of the plurality of groups with one of a) the dynamic similarity spread and b) the dynamic linkage spread associated with each of the plurality of groups and the customer profile and contextual information. Finally, the computer readable program, when executed on a computing device, causes the computing device to finetune the trained multivariate multiple binary ML model by modifying inputs associated with one of a) similarity spread and d) linkage spread until an optimal wilks lambda criterion is obtained, wherein the inputs comprises the distance matrix, the correlation matrix, the attribute matching percentage matrix and a linkage strength obtained from PCoA.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles:

FIG. 3 illustrates example tables for finding similarity of items for the processor implemented method for managing item returns, in accordance with some embodiments of the present disclosure.

DETAILED DESCRIPTION

Figure 1A:
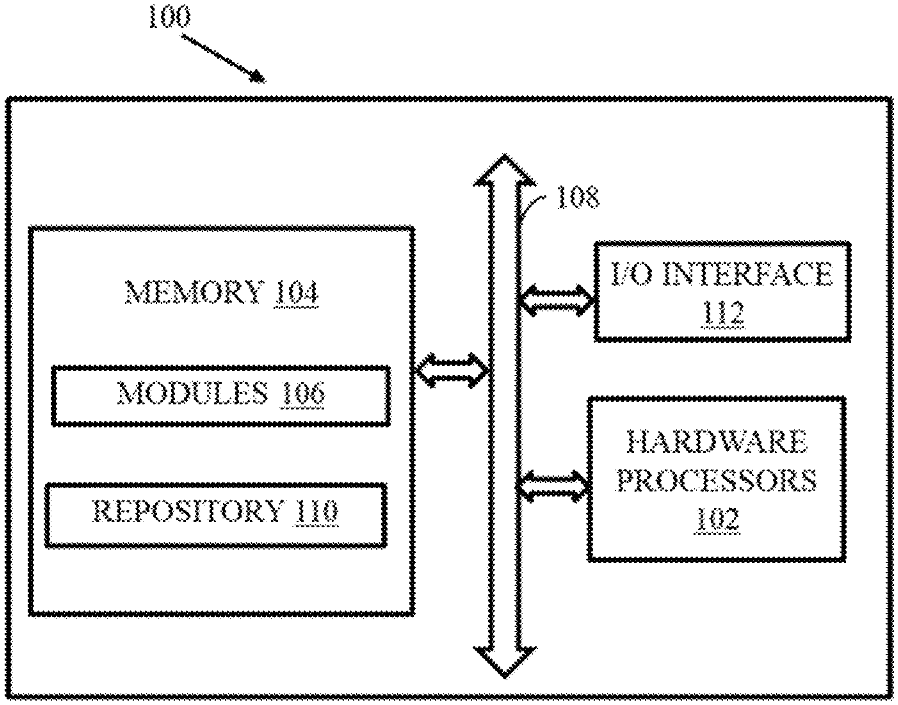
FIG. 1A is a functional block diagram of a system for managing item returns, in accordance with some embodiments of the present disclosure.

Exemplary embodiments are described with reference to the accompanying drawings. In the figures, the left-most digit(s) of a reference number identifies the figure in which the reference number first appears. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments.

To overcome the challenges of the conventional approaches, embodiments herein provide a method and system for managing item returns. In the present disclosure, items to be returned are estimated based on the type of items picked in association with the context. The context is the time of purchase, mode of purchase, shopper details, local events and the like. It is addressed by mapping return spread in unique format such as returned items are indicated in multiple columns and similarity spread in unique format such as similar items are indicated in multiple columns through multivariate models and training using historical purchase and return data. The return spread is related with similarity spread or linkage spread along with contextual factors through machine learning models for capturing the intrinsic mechanism that result returns by training a multivariate Machine Learning (ML) model using the actual return spread, the similarity spread, or the linkage spread and the customer profile data. The captured return mechanism is leveraged to pre-empt the returns in the form of return spread at the time of ordering or scanning the items in real time.to obtain a predicted return spread for a subgroup of an invoice.

The method maximizes accuracy of estimation of return propensity by dynamically adjusting a cut-off value for multivariate distance in a similarity matrix or adjusting a cut off value for linkage strength in a principal component of Principal Coordinate Analysis (PCoA) to identify similar items corresponding to an item of an invoice. The cut-off value of propensity for return to decide an item to be returned is adjusted by estimating and minimizing a gap between a predicted return spread and an actual return spread. A central database with the identified set of items to be returned is updated and it enables integration of a plurality of applications that are linked with the central data base to optimize operations associated with returns across value chain, wherein the plurality of applications pertains to CRM, automated emails, procurement, transport, logistic, storage, packaging, sales in brick and mortar stores, online sales, display, and advertisement.

Referring now to the drawings, more particularly to FIG. 1A through FIG. 3, where similar reference characters denote corresponding features consistently throughout the figures, there are shown preferred embodiments, and these embodiments are described in the context of the following exemplary system and/or method.

FIG. 1A is a functional block diagram of a system 100 for managing item returns, in accordance with some embodiments of the present disclosure. The system 100 includes or is otherwise in communication with hardware processors 102, at least one memory such as a memory 104, an Input/Output (I/O) interface 112. The hardware processors 102, memory 104, and the I/O interface 112 may be coupled by a system bus such as a system bus 108 or a similar mechanism. In an embodiment, the hardware processors 102 can be one or more hardware processors.

The I/O interface 112 may include a variety of software and hardware interfaces, for example, a web interface, a graphical user interface, and the like. The I/O interface 112 may include a variety of software and hardware interfaces, for example, interfaces for peripheral device(s), such as a keyboard, a mouse, an external memory, a printer and the like. Further, the I/O interface 112 may enable the system 100 to communicate with other devices, such as web servers, and external databases.

The I/O interface 112 can facilitate multiple communications within a wide variety of networks and protocol types, including wired networks, for example, local area network (LAN), cable, etc., and wireless networks, such as Wireless LAN (WLAN), cellular, or satellite. For the purpose, the I/O interface 112 may include one or more ports for connecting several computing systems with one another or to another server computer. The I/O interface 112 may include one or more ports for connecting several devices to one another or to another server.

The one or more hardware processors 102 may be implemented as one or more microprocessors, microcomputers, microcontrollers, digital signal processors, central processing units, node machines, logic circuitries, and/or any devices that manipulate signals based on operational instructions. Among other capabilities, the one or more hardware processors 102 is configured to fetch and execute computer-readable instructions stored in memory 104.

The memory 104 may include any computer-readable medium known in the art including, for example, volatile memory, such as static random access memory (SRAM) and dynamic random access memory (DRAM), and/or non-volatile memory, such as read only memory (ROM), erasable programmable ROM, flash memories, hard disks, optical disks, and magnetic tapes. In an embodiment, memory 104 includes a plurality of modules 106. Memory 104 also includes a data repository (or repository) 110 for storing data processed, received, and generated by the plurality of modules 106.

The plurality of modules 106 includes programs or coded instructions that supplement applications or functions performed by the system 100 for managing item returns. The plurality of modules 106, amongst other things, can include routines, programs, objects, components, and data structures, which perform particular tasks or implement particular abstract data types. The plurality of modules 106 may also be used as, signal processor(s), node machine(s), logic circuitries, and/or any other device or component that manipulates signals based on operational instructions. Further, the plurality of modules 106 can be used by hardware, by computer-readable instructions executed by the one or more hardware processors 102, or by a combination thereof. The plurality of modules 106 can include various sub-modules (not shown). The plurality of modules 106 may include computer-readable instructions that supplement applications or functions performed by the system 100 for managing item returns. For example, the plurality of modules includes a return spread generation module 122 (shown in FIG. 1B), a Dynamic similarity spread generation module 124 (shown in FIG. 1B), a dynamic linkage spread generation module 126 (shown in FIG. 1B), a multivariate multiple binary ML model training module 128 (shown in FIG. 1B), and a multivariate multiple binary ML model finetuning module 130 (shown in FIG. 1B).

Figure 1B:
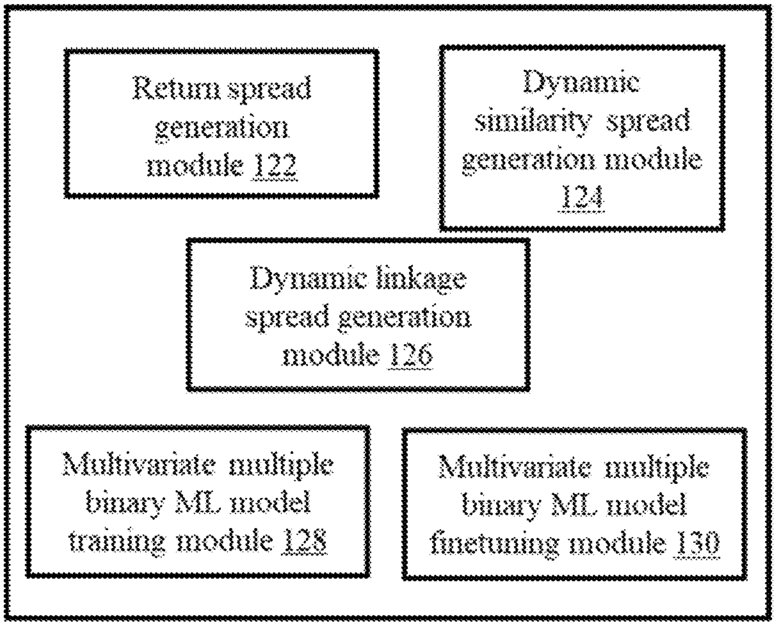
FIG. 1B illustrates modules of the system for managing item returns, in accordance with some embodiments of the present disclosure.

FIG. 1B illustrates the plurality of modules of a processor implemented method for managing item returns, in accordance with some embodiments of the present disclosure.

The data repository (or repository) 110 may include a plurality of abstracted pieces of code for refinement and data that is processed, received, or generated as a result of the execution of the plurality of modules in the module(s) 106.

Although the data repository 110 is shown internal to the system 100, it will be noted that, in alternate embodiments, the data repository 110 can also be implemented external to the system 100, where the data repository 110 may be stored within a database (repository 110) communicatively coupled to the system 100. The data contained within such an external database may be periodically updated. For example, new data may be added into the database (not shown in FIG. 1A) and/or existing data may be modified and/or non-useful data may be deleted from the database. In one example, the data may be stored in an external system, such as a Lightweight Directory Access Protocol (LDAP) directory and a Relational Database Management System (RDBMS). The working of the components of the system 100 are explained with reference to the method steps depicted in FIG. 2.

Figure 2A:
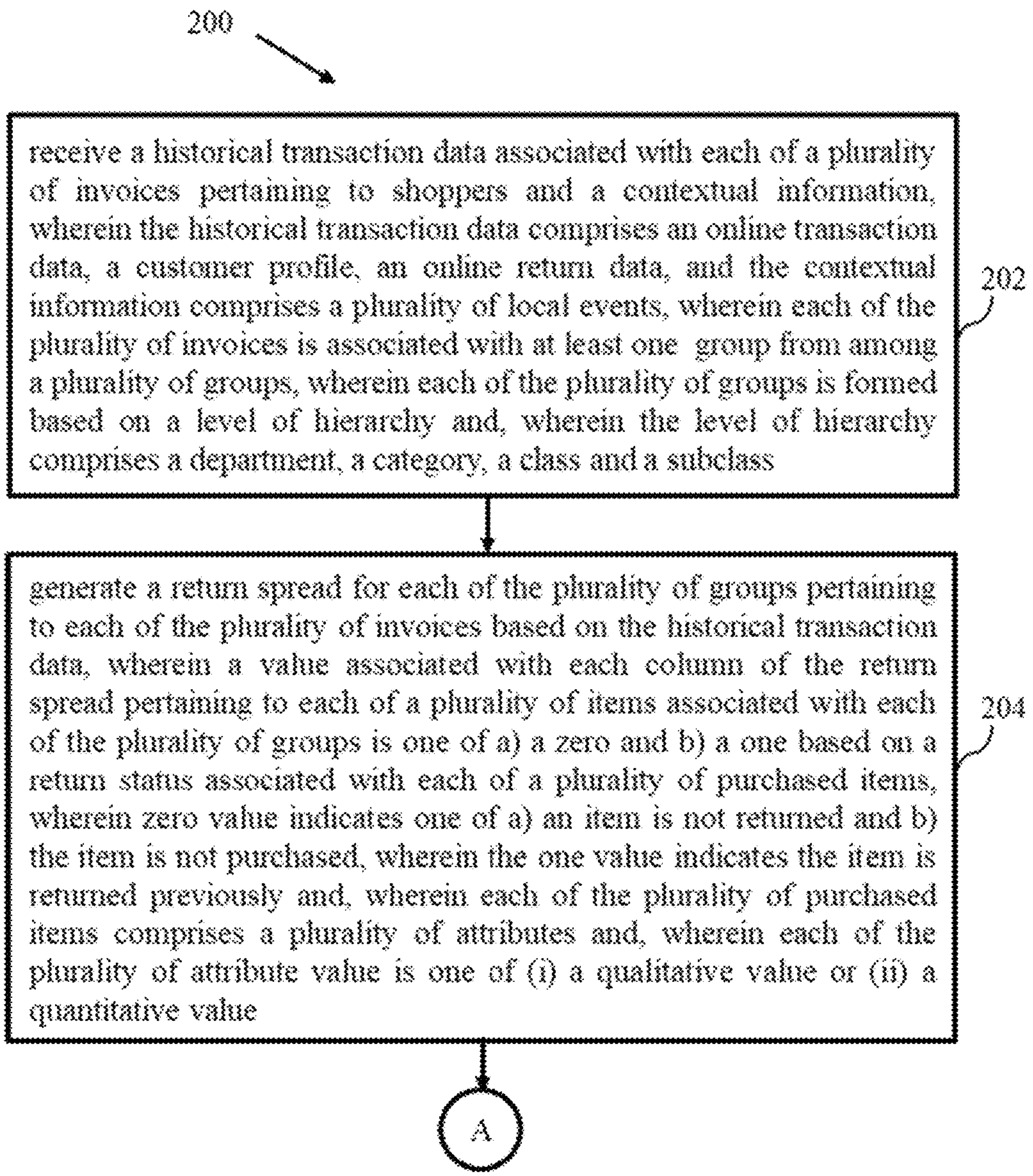
FIG. 2A and FIG. 2B (also referred to as FIG. 2) illustrate a flow diagram for a processor implemented method for managing item returns, in accordance with some embodiments of the present disclosure.
Figure 2B:
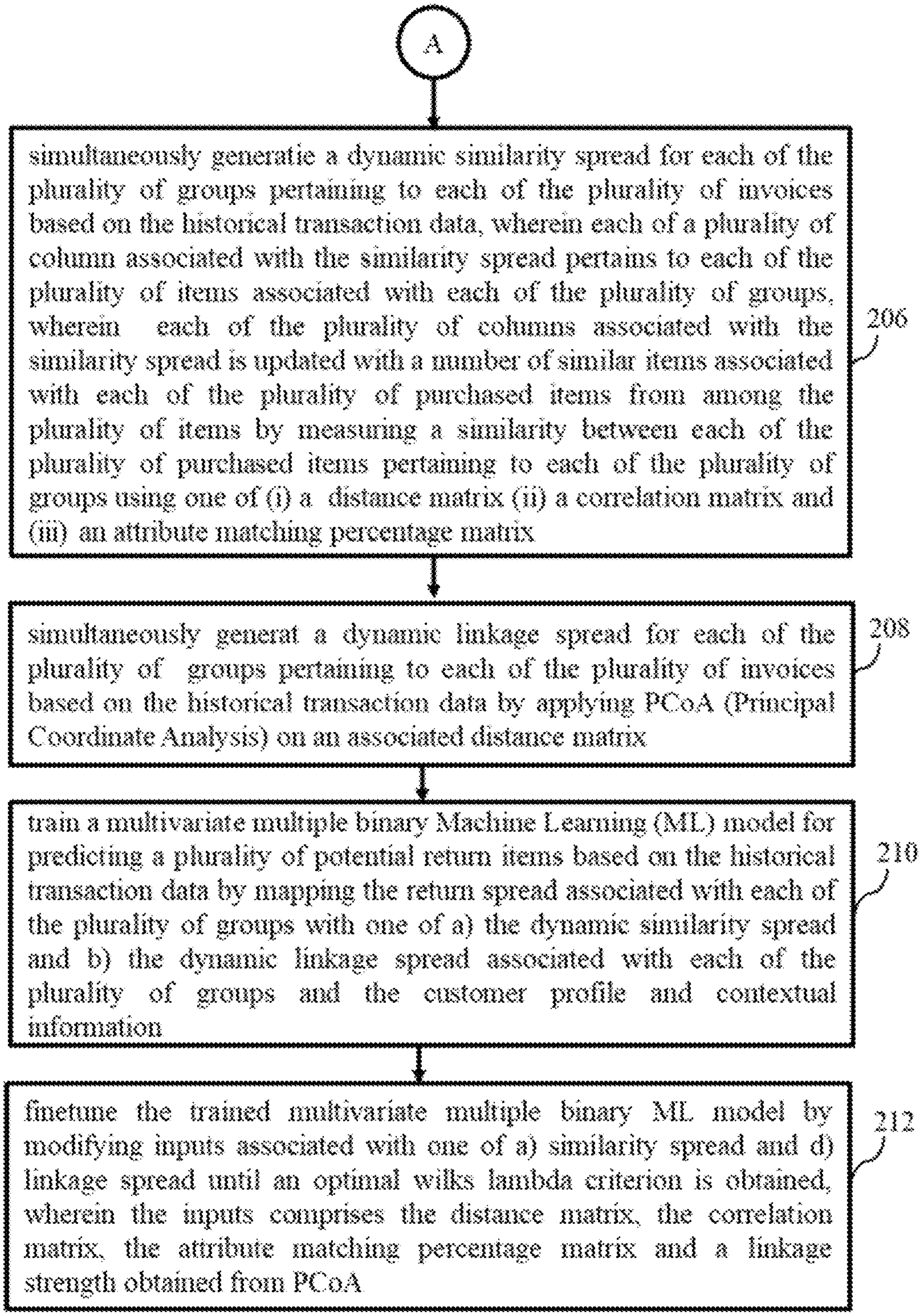

FIG. 2A and FIG. 2B (also referred to as FIG. 2) is an exemplary flow diagrams illustrating a method 200 for managing item returns implemented by the system of FIGS. 1A and 1B, according to some embodiments of the present disclosure. In an embodiment, the system 100 includes one or more data storage devices or the memory 104 operatively coupled to the one or more hardware processor(s) 102 and is configured to store instructions for execution of steps of the method 200 by the one or more hardware processors 102. The steps of method 200 of the present disclosure will now be explained with reference to the components or blocks of system 100 as depicted in FIGS. 1A and 1B and the steps of flow diagram as depicted in FIG. 2. The method 200 may be described in the general context of computer executable instructions. Generally, computer executable instructions can include routines, programs, objects, components, data structures, procedures, modules, functions, etc., that perform particular functions or implement particular abstract data types. Method 200 may also be practiced in a distributed computing environment where functions are performed by remote processing devices that are linked through a communication network. The order in which the method 200 is described is not intended to be construed as a limitation, and any number of the described method blocks can be combined in any order to implement the method 200, or an alternative method. Furthermore, the method 200 can be implemented in any suitable hardware, software, firmware, or combination thereof.

At step 202 of method 200, one or more hardware processors 102 are configured by the programmed instructions to receive a historical transaction data associated with each of a plurality of invoices pertaining to shoppers and a contextual information. The historical transaction data includes an online transaction data, a customer profile, an online return data, and the contextual information comprises a plurality of local events. Each of the plurality of invoices is associated with at least one group from among a plurality of groups. Each of the plurality of groups is formed based on a level of hierarchy. The level of hierarchy comprises a department, a category, a class and a subclass. A plurality of items (purchased by a shopper) in an invoice may have similarity with respect to the characteristics of other items. Those items having more similarity may be formed as a part of group or subgroup to indicate that the items within a part of group or subgroup may have more similarity with respect to shopper need. Items which have similar characteristics in terms of buying preferences are formed into a group. A group may be formed in many ways. In one embodiment, a group is formed based on the level of hierarchy. For example, all items belonging to a category is identified as a group by the system and the items selected or bought by the shopper may belong to part of the group. In another embodiment, a category may have 50 to 100 items and the items bought by the shopper may be 5 to 10 items. The category refers to a group of items having similar buying preferences or having attribute values that are alternative to each other. Examples for category are women's tops, women's suits, men's shirts, men's suits, and mobile etc. Each of the one or more attributes has a predefined attribute value. In one example, wherein a women's top comprises attributes such as brand, apparel size, color and design pattern, etc. Each attribute has predefined attribute values such as blue, green and red for color and small, medium, large for size of apparels. In another embodiment, all items within a class which is one level lower to category may be identified as a group by the system. A class is a subset of category, and it refers to a group of items or items that have similar buying preferences or having attribute values that are alternative to each other.

When each item of the shopper/consumer invoice is mapped with item hierarchy, an invoice may have part of one group or many groups of items. Here the group may be identified through class or subclass or category mapping. The minimum group size needs to be greater than two and the minimal size of the group may be decided by system based on real time performance. Those historical invoices having the specific part of group/subgroup with the current items for a dynamic period are filtered, integrated with additional information such as return information and the like.

During data integration and processing, one group is picked from the groups of an invoices and only one group is considered at a time for a series of steps of processing and return spread and similarity spread are found as explained in the later sections to enable using as input for the ML model.

It is assumed that all the items within a part of group may have inter dependency between the one or more items with respect to shopper intention. The interdependency may be at the time of shopping and at the time of returning the items. Interdependency at the time of shopping is captured in a specific format, termed as similarity spread and interdependency at the time of returning is captured in a specific format, termed as return spread which are explained in following steps 204 through 210.

At step 204 of method 200, the return spread generation module 122, when executed by the one or more hardware processors 102 is configured by the programmed instructions to generate a return spread for each of the plurality of groups pertaining to each of the plurality of invoices based on the historical transaction data, wherein a value associated with each column of the return spread pertaining to each of a plurality of items associated with each of the plurality of groups is one of a) a zero and b) a one based on a return status associated with each of a plurality of purchased items, wherein zero value indicates one of a) an item is not returned and b) the item is not purchased, wherein the one value indicates the item is returned previously and, wherein each of the plurality of purchased items comprises a plurality of attributes and, wherein each of the plurality of attribute value is one of (i) a qualitative value or (ii) a quantitative value.

At step 206, the dynamic similarity spread generation module 124, when executed by the one or more hardware processors 102 is configured by the programmed instructions to simultaneously generate a dynamic similarity spread for each of the plurality of groups pertaining to each of the plurality of invoices based on the historical transaction data, wherein each of a plurality of column associated with the similarity spread pertains to each of the plurality of items associated with each of the plurality of groups, wherein each of the plurality of columns associated with the similarity spread is updated with a number of similar items associated with each of the plurality of purchased items from among the plurality of items by measuring a similarity between each of the plurality of purchased items pertaining to each of the plurality of groups using one of (i) a distance matrix (ii) a correlation matrix and (iii) an attribute matching percentage matrix.

The steps for generating the dynamic similarity spread for each of the plurality of groups by measuring similarity between each of the plurality of purchased items pertaining to each of the plurality of groups using at least one of (i) the distance matrix, or (ii) the correlation matrix and (iii) the attribute matching percentage matrix includes the following. Initially, the qualitative attribute value associated with each of the plurality of purchased items corresponding to each of the plurality of groups are converted into quantitative value based on a sales performance associated with each of the plurality of purchased items. Further, the converted qualitative attribute value and the quantitative attribute values associated with each of the plurality of items are normalized using a standardization technique. Post normalization, one of (i) the distance matrix between each pair of purchased items from among the plurality of purchased item associated with each of the plurality of groups using the standardized attribute values (ii) the correlation matrix between each pair of purchased items associated with each of the plurality of groups using one of (a) a weekly (b) monthly and (c) yearly sales of the pair of the purchased items and (iii) the attribute matching percentage matrix for each pair of purchased items are computed by considering the attribute values associated with each of the plurality of purchased items. Finally, the dynamic similarity spread for each of the plurality of groups is generated by counting number of similar purchased items for each of the plurality of purchased items and filling in the dynamic similarity spread based on an ideal cut of value for one of (i) the distance matrix (ii) the correlation matrix and (iii) the attribute matching percentage matrix, wherein an associated ideal cut off value results in optimal wilks lambda criterion. An example for return spread is given in Table 1.

For example, the return spread is created by considering all the items within a subgroup/group. Return spread is created by considering returned items among the purchased items of a group. During integration of information, shopper specific returned items are integrated with corresponding invoice information. Return spread for each item group of each invoice is derived from the items returned and it is derived at invoice item subgroup level by creating multiple columns with indicator variable to capture spread of items during return. In an embodiment, a column namely 'return status for item_1' will take a value 0 or 1 based on the return status of the item 1. If the item got returned, then it is noted as '1' and if it is not returned then it is noted as '0' and here the '0' denotes those items belongs to a category which may or may not be bought by the shopper. The same procedure is followed for all the items of the item group. Thus, the return spread enables to capture underlying pattern that exist among the items of the item group that result in returns.

The return patterns can be in different forms. In one embodiment, it may be in the form of accepted items vs returned items. In another embodiment, it may be association among the accepted items. In yet another embodiment, it may be association among the returned items. This set up ensures simultaneous consideration of all the items within a group and also to capture inter dependency between the one or more items with respect to shopper intention with respect to returning of items within a group.

All the items within a group/subgroup of online assortment are considered to create return spread. If the size of subgroup is 'n' then the number of columns in the dependent variables is equal to 'n', among which the items returned are noted as '1' and other items are noted as '0'. This set up enables equal number of columns in the dependent variables across all the observations which is required to train a machine learning model.

TABLE 1

| Invoice ID | Subgroup of Items | Items Returned (Returned = 1, Not Returned = 0) Products (P1-P50), Subgroup size = 50 P_1 | P_m |
|---|---|---|---|
| Invoice_1 | In_1_SG_1 | 0 | 1 |
| Invoice_2 | In_2_SG_1 | 1 | 0 |
| Invoice_3 | In_3_SG_1 | | |
| Invoice_4 | In_4_SG_1 | | |
| . . . | | | |
| Invoice___ | | | |

An example similarity spread (in table format) obtained using distance matrix is given in Table 2B. Purchased items within the subgroup/group are compared pair wise for similarity based on the attribute values owned by them. Similarity of two items is measured based on many ways such as using one of the multivariate distance, correlation and attribute matching percentage and the like. (a) Similarity of two items is measured based on the multivariate distance measures. Multivariate measures such as Euclidean distance, mahalanobis distance etc., are calculated by using the Attribute Values (Avs) of quantitative nature. For example, the purchased items, with category mobile, may be identified with multiple ATs such as brand, memory size and color. Further, each AT can have multiple values, referred as the AVs. For example, the brand can have AVs as brand X, brand Y and brand Z. The memory size can have AVs such as 2 GB, 4 GB and 16 GB. The color can have AVs such as white, pink and black. Thus, each purchased item is defined by a set of AVs.

In an embodiment, for a category namely mobile, herein it can be (brand value, memory size, color value) such as item1=(X, 4 GB, white), item2=(X, 2 GB, pink), item3=(Y, 16 GB, black). Thus, it can be seen that the AVs associated with a category of item can have both a qualitative AV type, such as white color, X brand and/or a quantitative AV such as memory size of 4 GB. If the AVS are qualitative nature they are converted into numerical value based on their sales performance as per the FIG. 3. The sales share per day indicates importance given by a shopper or user to the respective AV. Further, this sales share per day information for the AV of interest can be easily extracted from an entity database. Thus, the AV level performance values, the plurality of AVs that belong to the qualitative AV type are converted to quantitative. Further, for the AVs that belong to quantitative type are already having quantitative values. However, the scale of qualitative AV type and quantitative AV type may not necessary be identical, hence standardization is required to bring all the values of the AV level performance estimating sales share per day and the values of the plurality of AVs belonging to the quantitative type to a uniform scale, for fair comparison. Standardization enables bringing all values to a uniform scale for a fair comparison. Standardization is done in accordance with known standardization or scaling technique. The distance measure is calculated for each pair of items with standardized AV values within the group of items, and it is presented in the form of distance matrix as shown in Table 2A.

TABLE 2A

| Item_id | 1 | 2 | 3 | 4 | 5 | 6 |
|---|---|---|---|---|---|---|
| 1 | 0 | 106.9 | 224.29 | 18400 | 18400.28 | 18401.34 |
| 2 | 106.9 | 0 | 120 | 18400.31 | 18400.03 | 18400.42 |
| 3 | 224.29 | 120 | 0 | 18401.37 | 18400.42 | 18400.03 |
| 4 | 18400 | 18400.31 | 18401.37 | 0 | 102 | 222 |
| 5 | 18400.28 | 18400.03 | 18400.42 | 102 | 0 | 120 |
| 6 | 18401.34 | 18400.42 | 18400.03 | 222 | 120 | 0 |

Correlation for two items is found by using "weekly" sales of those items. The duration may be modified to "day" or "month". Attribute matching percentage for two items is derived by considering the attribute values owned by those items. It may be derived by calculating the number of attributes matched between those items.

Dynamic similarity spread as shown in the table 2B is generated for each of the plurality of groups by counting number of similar purchased items for each of the plurality of purchased items and filling in the dynamic similarity spread based on an ideal cut of value for one of (i) the distance matrix (ii) the correlation matrix and (iii) the attribute matching percentage matrix. The associated ideal cut off value results in optimal wilks lambda criterion as explained in later sections.

TABLE 2B

| Invoice | Subgroup | — | — | Number of similar item for each item of an invoice (P1-P50) within the subgroup | | |
|---|---|---|---|---|---|---|
| ID | of Items | — | — | P_1 | — | P_m |
| Invoice_1 | In_1_SG_1 | — | — | 0 | — | 2 |
| Invoice_2 | In_2_SG_1 | — | — | 4 | — | 0 |
| Invoice_3 | In_3_SG_1 | | | | | |
| Invoice_4 | In_4_SG_1 | | | | | |
| . . . | | | | | | |
| Invoice___ | | | | | | |

Further, at step 206, the dynamic linkage spread generation module 126, when executed by the one or more hardware processors 102 is configured by the programmed instructions to simultaneously generate a dynamic linkage spread for each of the plurality of groups pertaining to each of the plurality of invoices based on the historical transaction data by applying PCoA on an associated distance matrix.

The steps for generating the dynamic linkage spread for each of the plurality of groups based on the historical transaction data and the associated distance matrix using the PCoA includes the following. Initially, indicator values to be filled in the dynamic linkage spread is generated based on a comparison between the linkage strength associated with each of the plurality of purchased items computed by the PCoA with a linkage strength threshold. The dynamic linkage spread as per Table 3B is filled with '0' if the corresponding linkage strength is less than the linkage strength threshold and filled with a '1' if the associated linkage strength is greater than the linkage strength threshold, wherein the linkage strength threshold results in optimal wilks lambda criterion. Finally, the dynamic linkage spread is generated based on the generated indicator values, wherein '0' indicates that the item is not linked with other items and '1' indicates that the item is linked with other items. An example linkage spread template is given in Table 3A and the corresponding dynamic linkage spread template is given in Table 3B.

The distance between two purchased items bought by the shopper is measured and is repeated for all pairs of items purchased by the shopper to form distance matrix. The distance matrix is applied as input for PCoA to extract principal components and linkage strength and to derive linkage spread. Applying PCoA enables to extract distinct components among the items bought by the shopper and they capture shopper buying intention. The components are extracted in the form of principal components. The quality of extracted components depends on the interrelationship between items selected by the shopper in terms of attribute values. The interrelationship between items is measured from quality of extracted component and linkage strength of each item and it is noted as linkage strength of an item and it is calculated as per equation (1). If the attribute values of each attribute among the items are more related, then the quality of extracted components will be higher side. The quality of components is measured from the variance contribution by the components.

$$\text{Linkage strength of an item} = \text{Sum (magnitude of importance of component } i * \text{loading of the item within the component } i) \tag{1}$$

The quantified measure of linkage strength of an item may have values ranging from 0 to 1 as per (Table 3A) in which value of 0 indicates that the item is not linked with other items and value of 1 indicates that the item is linked with other items to the maximum extent.

TABLE 3A

| Invoice ID | Subgroup of Items | — | — | Linkage Strength of Items (P1-P50) P_1 | P_n |
|---|---|---|---|---|---|
| Invoice_1 | In_1_SG_1 | — | — | 0.2 | 0.6 |
| Invoice_2 | In_2_SG_1 | — | — | 0 | 0 |
| Invoice_3 | In_3_SG_1 | | | | |
| Invoice_4 | In_4_SG_1 | | | | |
| . . . | | | | | |
| Invoice___ | | | | | |

If an item has significant linkage value, then it is coded such as 1 else 0 in the multiple columns as indicator variables as shown in Table 3B and it enable to capture spread of items in terms of linkage. The dynamic linkage spread is filled with 0 if the corresponding linkage strength of an item is less than the linkage strength threshold and filled with a 1 if the associated linkage strength value is greater than the linkage strength threshold. Here the linkage strength threshold results in optimal wilks lambda criterion

TABLE 3B

| Invoice ID | Subgroup of Items | — | — | Linkage Spread (P1-P50) P_1 | P_n |
|---|---|---|---|---|---|
| Invoice_1 | In_1_SG_1 | — | — | 0 | 1 |
| Invoice_2 | In_2_SG_1 | — | — | 0 | 0 |
| Invoice_3 | In_3_SG_1 | | | | |
| Invoice_4 | In_4_SG_1 | | | | |
| . . . | | | | | |
| Invoice___ | | | | | |

and each group is separated to form independent ML models. The ML model is explained in step 208 and 210.

Further, at step 208, the multivariate multiple binary ML model training module 128, when executed by the one or more hardware processors 102 is configured by the programmed instructions to train a multivariate multiple binary ML model based on the historical transaction data by mapping the return spread associated with each of the plurality of groups with one of a) the dynamic similarity spread and b) the dynamic linkage spread associated with each of the plurality of groups and the customer profile and contextual information in a format as indicated in Table 4. Multivariate multiple binary ML model is trained by applying the return spread as dependent variables and linkage spread or similar spread and other influencing factors as independent variables. The multivariate multiple binary ML model used in the present disclosure is a regression based model. The influencing factors are the number of identified similar items for each item in the transaction in the form of similarity spread, shopper profile, local events, time factors and the like. The influencing factors for the returns are received as raw or processed data from different sources. They form independent variables. The number of similar items related with each item in the form of similarity spread or linkage spread forms the major role as independent variables. Among the influencing factors, a number of events such as local events related to sports, cultural and the like are received from generative AI. Attribute value mismatch score for each item is derived by the AV displayed in image during online purchase and expected AV as per the item description given in online

TABLE 4

| Invoice ID | Subgroup of Items | YY/MM/DD/HH. | Derived variable from Time stamp | Old/Up-coming Event | Customer Age | Customer Income | Customer Ethnicity | Customer Profile_m | Items bought (bought = 1, not bought = 0) of an invoice within a subgroup P_1 | P_m | Number of similar item for each item of an invoice (P1-P50) within the subgroup P_1 | P_m |
|---|---|---|---|---|---|---|---|---|---|---|---|---|
| Invoice_1 | In_1_SG_1 | | | | | | | | 1 | 1 | 0 | 2 |
| Invoice_2 | In_2_SG_1 | | | | " | " | " | | 1 | 0 | 4 | 0 |
| Invoice_3 | In_3_SG_1 | | | | " | " | " | | | | | |
| Invoice_4 | In_4_SG_1 | | | | " | " | " | | | | | |
| . . . | | | | | " | " | " | | | | | |
| Invoice___ | | | | | " | " | " | | | | | |

It is assumed that interdependency at the time of online shopping, the items are related with interdependency at the time of returning the items which may be captured using machine learning models. Those invoices having a specific group for past dynamic period of time are filtered and processed to form return spread and similarity spread to use as input for ML model. The number of rows is equal to the number of filtered invoices that are having the specific group and used as input for ML model. The dynamic period may vary depending on the nature of category or class and the like. In an instance the period may be six months for seasonal items and thirty months for non-seasonal items. One invoice may have many groups with different period and the expected AV is received from generative AI. Age, gender, ethnicity and other variables related with the shopper are received from CRM system.

The present disclosure ensures simultaneous consideration of all the items within a group and also to capture inter dependency between the one or more items with respect to shopper intention with respect to returning of items within a group. The shopper's intention may be captured in many ways. In an instance, the common property among the items in the group is captured by finding similar items for each item in the group. Patterns in the return items are captured through machine learning models. More specifically, similarity of items in the form of 'similarity spread' is mapped with patterns in the return items in the form of return spread through ML models.

The multivariate multiple binary ML models are developed using random forest technique which is an ensemble learning method for regression. There are provisions in some of the open source software to consider multi-columns as dependent variables and independent variables as causative factors. In one example, an open source software, R software has package called Random Forest SRC. This package has provision to consider multivariate variables as dependent variables and independent variables as causative factors.

For example, Wilks lambda is computed by performing multivariate multiple regression between return spread and influencing factors. Wilks' Lambda is a positive-valued statistic that ranges from 0 to 1. Decreasing values of the statistic indicate effects that contribute more to the model. Wilks lambda is computed iteratively by changing the cut off value of the distance value for deciding two items as similar which is used as one of the influencing factors. Two items are said to be similar if those items are having the (a) distance (b) correlation value or (c) attribute matching percentage below a dynamic threshold which is decided by the system by finding a point in which optimal wilks lambda is attained while running multivariate multiple regression. In a similar way, the number of similar items for each item in the group is calculated and used as influencing factors for return in multivariate multi structure machine learning model. The model with optimal wilks lambda will have the prediction power with maximum possible accuracy. The accuracy of estimation of return propensity is maximized by fine tuning the dynamic cut of value used for identifying similarity items.

The learning phase of the multivariate multiple binary ML model is carried out by using the developed model with latest historical data and duration of historical data may vary depending on the retailer. In an instance, it may be the latest six months for fashion items and last two years for grocery retailers and the like. The trained multivariate multiple binary ML model is applied with real time information received from different sources for the group and probability prediction is carried out. During prediction, mismatch score and upcoming events may be received from generative AI based on the context. Among the influencing factors, a number of events such as local events related with sports, cultural and the like may be received from generative AI. Attribute value mismatch score for each item is derived by the AV displayed in image during online purchase and expected AV as per the item description given in online and the expected AV may be received from generative AI.

At step 210 of the method 200, the multivariate multiple binary Machine Learning (ML) model finetuning module 130, when executed by the one or more hardware processors 102 is configured by the programmed instructions to fine-tune the trained multivariate multiple binary ML model by modifying inputs associated with one of a) similarity spread and d) linkage spread until an optimal wilks lambda criterion is obtained, wherein the inputs comprises the distance matrix, the correlation matrix, the attribute matching percentage matrix and a linkage strength obtained from PCoA.

In an embodiment, a plurality of potential return items are identified from among the plurality of purchased items for a new shopper using the finetuned multivariate multiple binary ML model, wherein the plurality of potential return items are updated in a central database to optimize operations associated with potential return items across value chain. An example with predicted return items for a plurality items belonging to various groups are given in Table 5A, 5B and 5C respectively. The e commerce invoice in real time is processed as per the independent variables format and probability of return for each item in the item group is predicted using the trained multivariate multi structure model. Ideal cut off value for the predicted probability of return for retail strategies is fine-tuned based on performance during testing phase of return management system. Fine tuning of cut off value of predicted probability is done to narrow down the gap between predicted 'Return spread' vs actual 'Return spread'.

TABLE 5A

| Invoice ID | Subgroup of Items | Items having chance of returning = 1, No chance of returning = 0) Products (P1-P50) | |
|---|---|---|---|
| Invoice_1 | In_1_SG_1 | P_1 | P_m |
| Invoice_2 | In_2_SG_1 | 0 | 1 |

TABLE 5B

| Invoice ID | Subgroup of Items | Items having chance of returning = 1, No chance of returning = 0) Products (P1-P50) | |
|---|---|---|---|
| Invoice_1 | In_1_SG_2 | P_1 | P_n |
| Invoice_1 | In_1_SG_2 | 1 | 0 |

TABLE 5C

| Invoice ID | Subgroup of Items | Items having chance of returning = 1, No chance of returning = 0) Products (P1-P50) | |
|---|---|---|---|
| Invoice_1 | In_1_SG_3 | P_1 | P_q |
| Invoice_1 | In_1_SG_3 | 0 | 0 |

The magnitude of propensity of item returns provides direction for next level of action at individual transaction level. For example, if a particular transaction has high propensity value for items to be returned, then it indicates that there is an action is needed on return management. The identified list of items having a significant chance of return is updated in a central database which is linked with many applications associated with value chain. In one instance, central database is connected with CRM to enable sending automated email to shoppers with instructions on how to return items after they receive their order. It ensures that the potential items will be returned as quickly as possible so that those items will be placed for reselling in full price. In another embodiment, central database is connected with packing applications to enable inclusion of return labels in packing box to ensure that the potential items will be returned as quick as possible. In another embodiment, central database is connected with reward applications to enable advanced planning for providing of incentives/rewards for completing returns in the store and also considering additional purchase made in store during a return by shopper. In yet another embodiment, pre-empting of returns enables advanced planning associated with return value chain such as return initiation, printing of shipping labels, dropping off return package with shipping company, delivery of returns to consolidation warehouse and delivery of returns to retailer warehouse.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

The embodiments of the present disclosure herein address the unresolved problem of managing item returns. In the present disclosure, return of item(s) is preempted based on the type of items/category picked scanned in association with the context. Further, the item returns are analyzed in the form of return spread to capture inter dependency of items returned. Identification of commonality among items in the form of linkage spread and similarity of items are captured in the form similarity spread. Furthermore, the present disclosure identifies similarity between items based on the moving threshold in multivariate distance. Furthermore, the present disclosure includes automated parameter fine tuning based on final outcome in reality.

It is to be understood that the scope of the protection is extended to such a program and in addition to a computer-readable means having a message therein such computer-readable storage means contain program-code means for implementation of one or more steps of the method when the program runs on a server or mobile device or any suitable programmable device. The hardware device can be any kind of device which can be programmed including e.g., any kind of computer like a server or a personal computer, or the like, or any combination thereof. The device may also include means which could be e.g., hardware means like e.g., an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means, and software means. The method embodiments described herein could be implemented in hardware and software. The device may also include software means. Alternatively, the embodiments may be implemented on different hardware devices, e.g., using a plurality of CPUs, GPUs and edge computing devices.

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items or meant to be limited to only the listed item or items. It must also be noted that as used herein and in the appended claims, the singular forms "a," "an," and "the" include plural references unless the context clearly dictates otherwise. Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e. non-transitory. Examples include random access memory (RAM), read-only memory (ROM), volatile memory, non-volatile memory, hard drives, CD ROMs, DVDs, flash drives, disks, and any other known physical storage media.

It is intended that the disclosure and examples be considered as exemplary only, with a true scope of disclosed embodiments being indicated by the following claims.

What is claimed is:

1. A processor-implemented method, the method comprising:

receiving, via one or more hardware processors, a historical transaction data associated with each of a plurality of invoices pertaining to shoppers and a contextual information, wherein the historical transaction data comprises an online transaction data, a customer profile, an online return data, and the contextual information comprises a plurality of local events, wherein the plurality of local events include sports events, cultural events received from generative Artificial Intelligence (AI), wherein each of the plurality of invoices is associated with at least one group from among a plurality of groups, wherein each of the plurality of groups is formed based on a level of hierarchy, and wherein the level of hierarchy comprises a department, a category, a class, and a subclass;

generating, via the one or more hardware processors, a return spread for each of the plurality of groups pertaining to each of the plurality of invoices based on the historical transaction data, wherein a value associated with each column of the return spread pertaining to each of a plurality of items associated with each of the plurality of groups is one of a) a zero and b) a one based on a return status associated with each of a plurality of purchased items, wherein zero value indicates one of a) an item is not returned and b) the item is not purchased, wherein the one value indicates the item is returned previously and, wherein each of the plurality of purchased items comprises a plurality of attributes and, wherein each of the plurality of attribute value is one of (i) a qualitative value or (ii) a quantitative value;

simultaneously generating, via the one or more hardware processors, a dynamic similarity spread for each of the plurality of groups pertaining to each of the plurality of invoices based on the historical transaction data, wherein each of a plurality of column associated with the similarity spread pertains to each of the plurality of items associated with each of the plurality of groups, wherein each of the plurality of columns associated with the similarity spread is updated with a number of similar items associated with each of the plurality of purchased items from among the plurality of items by measuring a similarity between each of the plurality of purchased items pertaining to each of the plurality of groups using one of (i) a distance matrix (ii) a correlation matrix and (iii) an attribute matching percentage matrix;

simultaneously generating, via the one or more hardware processors, a dynamic linkage spread for each of the plurality of groups pertaining to each of the plurality of invoices based on the historical transaction data by applying PCoA (Principal Coordinate Analysis) on an associated distance matrix;

dynamically adjusting a cut-off value for multivariate distance in a similarity matrix or adjusting a cut-off value for linkage strength in a principal component of the PCoA to identify similar items corresponding to an item of an invoice, and a cut-off value of propensity for return to decide an item to be returned is adjusted by estimating and minimizing a gap between a predicted return spread and an actual return spread;

training, via the one or more hardware processors, a multivariate multiple binary Machine Learning (ML) model for predicting a plurality of potential return items based on the historical transaction data by mapping the return spread associated with each of the plurality of groups with one of a) the dynamic similarity spread and b) the dynamic linkage spread associated with each of the plurality of groups and the customer profile and contextual information, wherein the return spread is related with the dynamic similarity spread or the dynamic linkage spread along with the contextual information through machine learning models for capturing intrinsic mechanism that result returns by training the multivariate multiple binary ML model using the actual return spread, the dynamic similarity spread, or the dynamic linkage spread and the customer profile, and the captured return mechanism is leveraged to pre-empt the returns online in the form of the return spread at the time of ordering or scanning the items in real time.to obtain the predicted return spread for a subgroup of an invoice;

finetuning, via the one or more hardware processors, the trained multivariate multiple binary ML model by modifying inputs associated with one of a) similarity spread and d) linkage spread until an optimal wilks lambda criterion is obtained, wherein the inputs comprise the distance matrix, the correlation matrix, the attribute matching percentage matrix and a linkage strength obtained from PCoA;

using the finetuned multivariate multiple binary ML model to predict the plurality of potential return items from among the plurality of purchased items for a new shopper, during inferencing stage, wherein the prediction of the plurality of potential return items is used as input to optimize operations associated with the plurality of potential return items across value chain, wherein the plurality of potential return items are updated in a central database which is linked with a plurality of applications associated with the value chain, wherein the finetuned multivariate multiple binary ML model is applied with real time information received from different sources for the group to predict the plurality of potential return items, and during prediction, an attribute value mismatch score and upcoming events are received from the generative AI based on the context; and communicating, via the one or more hardware processors, the predicted plurality of potential return items to an associated application from the plurality of applications linked with the central database to enable automation of emails to shoppers with instructions on returning items after they receive their order, inclusion of return labels in a packing box to ensure that potential items will be returned, and an advanced planning for providing of incentives or rewards for completing returns in a store and considering additional purchase made in the store during a return by a shopper.

2. The method of claim 1, wherein plurality the plurality of potential return items are estimated based on a type of items picked in association with context, wherein a minimum group size of the at least one group from among a plurality of groups is greater than two, decided by a system based on a real time performance, wherein the plurality of invoices having a specific part of group or subgroup with current items for a dynamic period are filtered and integrated with additional information including return information, wherein when each invoice of the plurality of invoices includes a plurality of groups with different period, then each group is separated to form independent machine learning models.

3. The method of claim 1, wherein the steps for generating the dynamic similarity spread for each of the plurality of groups by measuring similarity between each of the plurality of purchased items pertaining to each of the plurality of groups comprises:

converting the qualitative attribute value associated with each of the plurality of purchased items corresponding to each of the plurality of groups into quantitative value based on a sales performance associated with each of the plurality of purchased items;

standardizing the converted qualitative attribute value and the quantitative attribute values associated with each of the plurality of items using a standardization technique;

computing one of (i) the distance matrix between each pair of purchased items from among the plurality of purchased item associated with each of the plurality of groups using the standardized attribute values (ii) the correlation matrix between each pair of purchased items associated with each of the plurality of groups using one of (a) a weekly (b) monthly and (c) yearly sales of the pair of the purchased items and (iii) the attribute matching percentage matrix for each pair of purchased items by considering the attribute values associated with each of the plurality of purchased items; and generating the dynamic similarity spread for each of the plurality of groups by counting number of similar purchased items for each of the plurality of purchased items and filling in the dynamic similarity spread based on an ideal cut of value for one of (i) the distance matrix (ii) the correlation matrix and (iii) the attribute matching percentage matrix, wherein an associated ideal cut off value results in optimal wilks lambda criterion, wherein wilks lambda is computed iteratively by changing a cut off value of the distance matrix for deciding two items as similar which is used as one of influencing factors, wherein the two items are similar if those items are having (a) a distance value (b) a correlation value or (c) an attribute matching percentage below a dynamic threshold which is decided by the system by finding a point in which optimal wilks lambda is attained while running multivariate multiple regression, and the multivariate multiple binary ML model with optimal wilks lambda have a prediction power with maximum possible accuracy and an accuracy of estimation of return propensity is maximized by fine tuning dynamic cut of value used for identifying similarity items based on performance during testing phase of return management system, thereby narrowing down a gap between the predicted return spread and the actual return spread.

4. The method of claim 1, wherein the steps for generating the dynamic linkage spread for each of the plurality of groups based on the historical transaction data and the associated distance matrix using the PCoA comprises:

generating indicator values to be filled in the dynamic linkage spread based on a comparison between the linkage strength associated with each of the plurality of purchased items computed by the PCoA with a linkage strength threshold, wherein the dynamic spread is filled with '0' if the corresponding linkage strength is less than the linkage strength threshold and filled with a '1' if the associated linkage strength is greater than the linkage strength threshold wherein the linkage strength threshold results in optimal wilks lambda criterion; and updating the dynamic linkage spread based on the generated indicator values, wherein '0' indicates that the item is not linked with other items and '1' indicates that the item is linked with other items.

5. The method of claim 1, wherein the return spread enables to capture return patterns that exists among the plurality of items of the item group that result in returns, and the return patterns are in different forms including in the form of accepted items versus returned items, association among the accepted items, association among the returned items for simultaneous consideration of all the items within the item group and capture inter dependency between one or more items with respect to a shopper intention with respect to returning of plurality of items within the item group.

6. The method of claim 1, wherein the multivariate multiple binary ML model is trained by applying the return spread as dependent variables and the dynamic linkage spread or the dynamic similarity spread and other influencing factors as independent variables.

7. The method of claim 1, wherein the central database enables integration of the plurality of applications that are linked with the central database, wherein the central database is connected with a Customer Relationship Management (CRM) system to enable sending automated email to the shoppers, the central database is connected with packing applications to enable the inclusion of the return labels in the packing box, the central database is connected with reward applications to enable the advanced planning, wherein the pre-empting of returns enables advanced planning associated with return value chain including a return initiation, printing of shipping labels, dropping off return package with shipping company, delivery of returns to consolidation warehouse and delivery of returns to retailer warehouse.

8. The method of claim 1, wherein all items within a group or a subgroup of an online assortment are considered to create the return spread, and wherein when a size of the subgroup is 'n' then a number of columns in an dependent variables is equal to 'n', among which the items returned are noted as one and other items are noted as zero, thereby enabling equal number of columns in the dependent variables across all observations required to train a machine learning model, and wherein the attribute value mismatch score for each item is derived by an attribute value (AV) displayed in image during online purchase and expected AV as per the item description provided online and the expected AV is received from the generative AI.

9. A system comprising:

at least one memory storing programmed instructions;

one or more Input/Output (I/O) interfaces; and one or more hardware processors operatively coupled to the at least one memory, wherein the one or more hardware processors are configured by the programmed instructions to:

receive a historical transaction data associated with each of a plurality of invoices pertaining to shoppers and a contextual information, wherein the historical transaction data comprises an online transaction data, a customer profile, an online return data, and the contextual information comprises a plurality of local events, wherein the plurality of local events include sports events, cultural events received from generative Artificial Intelligence (AI), wherein each of the plurality of invoices is associated with at least one group from among a plurality of groups, wherein each of the plurality of groups is formed based on a level of hierarchy, and wherein the level of hierarchy comprises a department, a category, a class, and a subclass;

generate a return spread for each of the plurality of groups pertaining to each of the plurality of invoices based on the historical transaction data, wherein a value associated with each column of the return spread pertaining to each of a plurality of items associated with each of the plurality of groups is one of a) a zero and b) a one based on a return status associated with each of a plurality of purchased items, wherein zero value indicates one of a) an item is not returned and b) the item is not purchased, wherein the one value indicates the item is returned previously and, wherein each of the plurality of purchased items comprises a plurality of attributes and, wherein each of the plurality of attribute value is one of (i) a qualitative value or (ii) a quantitative value;

simultaneously generate a dynamic similarity spread for each of the plurality of groups pertaining to each of the plurality of invoices based on the historical transaction data, wherein each of a plurality of column associated with the similarity spread pertains to each of the plurality of items associated with each of the plurality of groups, wherein each of the plurality of columns associated with the similarity spread is updated with a number of similar items associated with each of the plurality of purchased items from among the plurality of items by measuring a similarity between each of the plurality of purchased items pertaining to each of the plurality of groups using one of (i) a distance matrix (ii) a correlation matrix and (iii) an attribute matching percentage matrix;

simultaneously generate a dynamic linkage spread for each of the plurality of groups pertaining to each of the plurality of invoices based on the historical transaction data by applying PCoA (Principal Coordinate Analysis) on an associated distance matrix;

dynamically adjust a cut-off value for multivariate distance in a similarity matrix or adjust a cut-off value for linkage strength in a principal component of the PCoA to identify similar items corresponding to an item of an invoice, and a cut-off value of propensity for return to decide an item to be returned is adjusted by estimating and minimizing a gap between a predicted return spread and an actual return spread;

train a multivariate multiple binary Machine Learning (ML) model for predicting a plurality of potential return items based on the historical transaction data by mapping the return spread associated with each of the plurality of groups with one of a) the dynamic similarity spread and b) the dynamic linkage spread associated with each of the plurality of groups and the customer profile and contextual information, wherein the return spread is related with the dynamic similarity spread or the dynamic linkage spread along with the contextual information through machine learning models for capturing intrinsic mechanism that result returns by training the multivariate multiple binary ML model using the actual return spread, the dynamic similarity spread, or the dynamic linkage spread and the customer profile, and the captured return mechanism is leveraged to pre-empt the returns online in the form of the return spread at the time of ordering or scanning the items in real time.to obtain the predicted return spread for a subgroup of an invoice; and finetune the trained multivariate multiple binary ML model by modifying inputs associated with one of a) similarity spread and d) linkage spread until an optimal wilks lambda criterion is obtained, wherein the inputs comprises the distance matrix, the correlation matrix, the attribute matching percentage matrix and a linkage strength obtained from PCoA;

use the finetuned multivariate multiple binary ML model to predict the plurality of potential return items from among the plurality of purchased items for a new shopper, during inferencing stage, wherein the prediction of the plurality of potential return items is used as input to optimize operations associated with the plurality of potential return items across value chain, wherein the plurality of potential return items are updated in a central database which is linked with a plurality of applications associated with the value chain, wherein the finetuned multivariate multiple binary ML model is applied with real time information received from different sources for the group to predict the plurality of potential return items, and during prediction, an attribute value mismatch score and upcoming events are received from the generative AI based on the context; and communicate the predicted plurality of potential return items to an associated application from the plurality of applications linked with the central database to enable automation of emails to shoppers with instructions on returning items after they receive their order, inclusion of return labels in a packing box to ensure that potential items will be returned, or an advanced planning for providing of incentives or rewards for completing returns in a store and considering additional purchase made in the store during a return by a shopper.

10. The system of claim 9, wherein the steps for generating the dynamic similarity spread for each of the plurality of groups by measuring similarity between each of the plurality of purchased items pertaining to each of the plurality of groups comprises:

converting the qualitative attribute value associated with each of the plurality of purchased items corresponding to each of the plurality of groups into quantitative value based on a sales performance associated with each of the plurality of purchased items;

standardizing the converted qualitative attribute value and the quantitative attribute values associated with each of the plurality of items using a standardization technique;

computing one of (i) the distance matrix between each pair of purchased items from among the plurality of purchased item associated with each of the plurality of groups using the standardized attribute values (ii) the correlation matrix between each pair of purchased items associated with each of the plurality of groups using one of (a) a weekly (b) monthly and (c) yearly sales of the pair of the purchased items and (iii) the attribute matching percentage matrix for each pair of purchased items by considering the attribute values associated with each of the plurality of purchased items; and generating the dynamic similarity spread for each of the plurality of groups by counting number of similar purchased items for each of the plurality of purchased items and filling in the dynamic similarity spread based on an ideal cut of value for one of (i) the distance matrix (ii) the correlation matrix and (iii) the attribute matching percentage matrix, wherein an associated ideal cut off value results in optimal wilks lambda criterion.

11. The system of claim 9, wherein the steps for generating the dynamic linkage spread for each of the plurality of groups based on the historical transaction data and the associated distance matrix using the PCoA comprises:

generating indicator values to be filled in the dynamic linkage spread based on a comparison between the linkage strength associated with each of the plurality of purchased items computed by the PCoA with a linkage strength threshold, wherein the dynamic spread is filled with '0' if the corresponding linkage strength is less than the linkage strength threshold and filled with a '1' if the associated linkage strength is greater than the linkage strength threshold wherein the linkage strength threshold results in optimal wilks lambda criterion; and updating the dynamic linkage spread based on the generated indicator values, wherein '0' indicates that the item is not linked with other items and '1' indicates that the item is linked with other items.

12. One or more non-transitory machine readable information storage mediums comprising one or more instructions which when executed by one or more hardware processors cause:

receiving, a historical transaction data associated with each of a plurality of invoices pertaining to shoppers and a contextual information, wherein the historical transaction data comprises an online transaction data, a customer profile, an online return data, and the contextual information comprises a plurality of local events, wherein the plurality of local events include sports events, cultural events received from generative Artificial Intelligence (AI), wherein each of the plurality of invoices is associated with at least one group from among a plurality of groups, wherein each of the plurality of groups is formed based on a level of hierarchy, and wherein the level of hierarchy comprises a department, a category, a class, and a subclass;

generating, a return spread for each of the plurality of groups pertaining to each of the plurality of invoices based on the historical transaction data, wherein a value associated with each column of the return spread pertaining to each of a plurality of items associated with each of the plurality of groups is one of a) a zero and b) a one based on a return status associated with each of a plurality of purchased items, wherein zero value indicates one of a) an item is not returned and b) the item is not purchased, wherein the one value indicates the item is returned previously and, wherein each of the plurality of purchased items comprises a plurality of attributes and, wherein each of the plurality of attribute value is one of (i) a qualitative value or (ii) a quantitative value;

simultaneously generating, a dynamic similarity spread for each of the plurality of groups pertaining to each of the plurality of invoices based on the historical transaction data, wherein each of a plurality of column associated with the similarity spread pertains to each of the plurality of items associated with each of the plurality of groups, wherein each of the plurality of columns associated with the similarity spread is updated with a number of similar items associated with each of the plurality of purchased items from among the plurality of items by measuring a similarity between each of the plurality of purchased items pertaining to each of the plurality of groups using one of (i) a distance matrix (ii) a correlation matrix and (iii) an attribute matching percentage matrix;

simultaneously generating, a dynamic linkage spread for each of the plurality of groups pertaining to each of the plurality of invoices based on the historical transaction data by applying PCoA (Principal Coordinate Analysis) on an associated distance matrix;

dynamically adjusting a cut-off value for multivariate distance in a similarity matrix or adjusting a cut-off value for linkage strength in a principal component of the PCoA to identify similar items corresponding to an item of an invoice, and a cut-off value of propensity for return to decide an item to be returned is adjusted by estimating and minimizing a gap between a predicted return spread and an actual return spread;

training, a multivariate multiple binary Machine Learning (ML) model for predicting a plurality of potential return items based on the historical transaction data by mapping the return spread associated with each of the plurality of groups with one of a) the dynamic similarity spread and b) the dynamic linkage spread associated with each of the plurality of groups and the customer profile and contextual information, wherein the return spread is related with the dynamic similarity spread or the dynamic linkage spread along with the contextual information through machine learning models for capturing intrinsic mechanism that result returns by training the multivariate multiple binary ML model using the actual return spread, the dynamic similarity spread, or the dynamic linkage spread and the customer profile, and the captured return mechanism is leveraged to pre-empt the returns online in the form of the return spread at the time of ordering or scanning the items in real time.to obtain the predicted return spread for a subgroup of an invoice;

finetuning, the trained multivariate multiple binary ML model by modifying inputs associated with one of a) similarity spread and d) linkage spread until an optimal wilks lambda criterion is obtained, wherein the inputs comprise the distance matrix, the correlation matrix, the attribute matching percentage matrix and a linkage strength obtained from PCoA;

using the finetuned multivariate multiple binary ML model to predict the plurality of potential return items from among the plurality of purchased items for a new shopper, during inferencing stage, wherein the prediction of the plurality of potential return items is used as input to optimize operations associated with the plurality of potential return items across value chain, wherein the plurality of potential return items are updated in a central database which is linked with a plurality of applications associated with the value chain, wherein the finetuned multivariate multiple binary ML model is applied with real time information received from different sources for the group to predict the plurality of potential return items, and during prediction, an attribute value mismatch score and upcoming events are received from the generative AI based on the context; and communicating the predicted plurality of potential return items to an associated application from the plurality of applications linked with the central database to enable automation of emails to shoppers with instructions on returning items after they receive their order, inclusion of return labels in a packing box to ensure that potential items will be returned, or an advanced planning for providing of incentives or rewards for completing returns in a store and considering additional purchase made in the store during a return by a shopper.

13. The one or more non-transitory machine-readable information storage mediums of claim 12, wherein the steps for generating the dynamic similarity spread for each of the plurality of groups by measuring similarity between each of the plurality of purchased items pertaining to each of the plurality of groups comprises:

converting the qualitative attribute value associated with each of the plurality of purchased items corresponding to each of the plurality of groups into quantitative value based on a sales performance associated with each of the plurality of purchased items;

standardizing the converted qualitative attribute value and the quantitative attribute values associated with each of the plurality of items using a standardization technique;

computing one of (i) the distance matrix between each pair of purchased items from among the plurality of purchased item associated with each of the plurality of groups using the standardized attribute values (ii) the correlation matrix between each pair of purchased items associated with each of the plurality of groups using one of (a) a weekly (b) monthly and (c) yearly sales of the pair of the purchased items and (iii) the attribute matching percentage matrix for each pair of purchased items by considering the attribute values associated with each of the plurality of purchased items; and generating the dynamic similarity spread for each of the plurality of groups by counting number of similar purchased items for each of the plurality of purchased items and filling in the dynamic similarity spread based on an ideal cut of value for one of (i) the distance matrix (ii) the correlation matrix and (iii) the attribute matching percentage matrix, wherein an associated ideal cut off value results in optimal wilks lambda criterion.

14. The one or more non-transitory machine-readable information storage mediums of claim 12, wherein the steps for generating the dynamic linkage spread for each of the plurality of groups based on the historical transaction data and the associated distance matrix using the PCoA comprises:

generating indicator values to be filled in the dynamic linkage spread based on a comparison between the linkage strength associated with each of the plurality of purchased items computed by the PCoA with a linkage strength threshold, wherein the dynamic spread is filled with '0' if the corresponding linkage strength is less than the linkage strength threshold and filled with a '1' if the associated linkage strength is greater than the linkage strength threshold wherein the linkage strength threshold results in optimal wilks lambda criterion; and updating the dynamic linkage spread based on the generated indicator values, wherein '0' indicates that the item is not linked with other items and '1' indicates that the item is linked with other items.

* * * * *